United States Patent
Xu et al.

(10) Patent No.: US 11,263,264 B2
(45) Date of Patent: *Mar. 1, 2022

(54) MANAGEMENT OF GRAPHS USING SECONDARY INDEX VERTICES

(71) Applicant: GraphSQL, Inc., Redwood City, CA (US)

(72) Inventors: Yu Xu, Millbrae, CA (US); Xinyu Chang, Menlo Park, CA (US); Zixuan Zhuang, San Jose, CA (US); Dan Hu, Sunnyvale, CA (US)

(73) Assignee: GraphSQL, Inc., Redwood City, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/415,520

(22) Filed: May 17, 2019

(65) Prior Publication Data

US 2020/0364268 A1    Nov. 19, 2020

(51) Int. Cl.
*G06F 16/901* (2019.01)

(52) U.S. Cl.
CPC ............... *G06F 16/9024* (2019.01)

(58) Field of Classification Search
CPC .................................. G06F 16/9024
See application file for complete search history.

(56) References Cited

U.S. PATENT DOCUMENTS

| | | | |
|---|---|---|---|
| 10,657,125 B1* | 5/2020 | Gautam | G06F 40/40 |
| 2017/0068748 A1* | 3/2017 | Hu | G06F 16/9017 |
| 2018/0136830 A1* | 5/2018 | Kindelsberger | G06T 11/206 |
| 2018/0329958 A1* | 11/2018 | Choudhury | G06F 16/2343 |

* cited by examiner

*Primary Examiner* — Jorge A Casanova

(57) ABSTRACT

Systems, methods, and software described herein provide improvements to graph indexing. In one implementation, a graph management system may identify an event to generate a new vertex type to index a graph based on an attribute type in one or more vertices of the graph. In response to the event, the graph management system may generate one or more new indexing vertices that correspond to the new vertex type and may connect each of the one or more vertices to the one or more new indexing vertices based on an attribute in the vertex.

17 Claims, 8 Drawing Sheets

MANAGEMENT OF GRAPHS USING SECONDARY INDEX VERTICES

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from point A to point B is considered to be the same as a line from point B to point A. In a directed graph, the two directions are treated as distinct directed edges.

Although graph databases provide an efficient manner for storing data, difficulties can arise in efficiently responding to queries of the graph. In particular, as graphs expand with a greater quantity of vertices and edges, queries to the graphs may consume additional processing and time resources to search the graph and respond to the queries. These difficulties are often compounded when each of the vertices includes multiple searchable attributes, such as names, ages, birthdays, or other similar attributes, requiring a system to traverse the vertices of the graph to identify vertices (or edges) with a relevant attribute.

OVERVIEW

Provided herein are enhancements to managing graph indexing for a graph database. In one implementation, a graph management system may identify an event to generate a new vertex type in a graph, wherein the graph comprises a plurality of edges and a plurality of vertices, and wherein the new vertex type is associated with an attribute type in one or more vertices of the plurality of vertices. The graph management system further generates new vertices based on the attribute type in response to the event and identifies an attribute corresponding to the attribute type for each vertex of the one or more vertices. Once the attributes are identified for the one or more vertices, the graph management system, for each vertex of the one or more vertices, generates an edge to one of the new vertices based on the attribute identified for the vertex.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Examples herein provide enhancements for the management of graphs in a computing environment. In particular, a graph database within a computing environment stores one or more graphs, wherein each of the graphs store data in the form of vertices and edges, where a vertex represents a data instance, and an edge represents a relationship of some type between any two vertices. In some implementations, each of the vertices may comprise attributes that provide information about the particular data instance. For example, a graph may represent friendships between users of a social network, wherein the vertices may include user information or attributes, such as username, birthday, age, profession, or some other similar information, and the edges may indicate which users are friends.

In the present implementation, a graph management system or service may generate new index vertices to assist in responding to various queries to a particular graph. For example, a graph may include vertices that each comprise a plurality of attributes, and wherein a first attribute type may be used in indexing the vertices, such as a unique identifier associated with each of the vertices. To assist in searching the graph, new index vertices may be generated that correspond to another attribute type that was not used in indexing the vertices. As an illustrative example using the social network graph provided above, an initial graph may include data vertices that are indexed using unique user identifiers and edges that connect the user identifiers with their corresponding friends. To assist in querying information from the graph, a graph management system may generate new index vertices that can index specific attributes for the data vertices. For example, if queries often select vertices based on user ages, new index vertices may be added that each correspond to an age or a range of ages. The data vertices may then be coupled to the new index vertices based on the corresponding age attributes. Thus, rather than traversing the unique user identifiers to identify users that correspond to a particular age, the graph management system may traverse the new index vertices to identify the relevant users to a query.

Figure 1A:
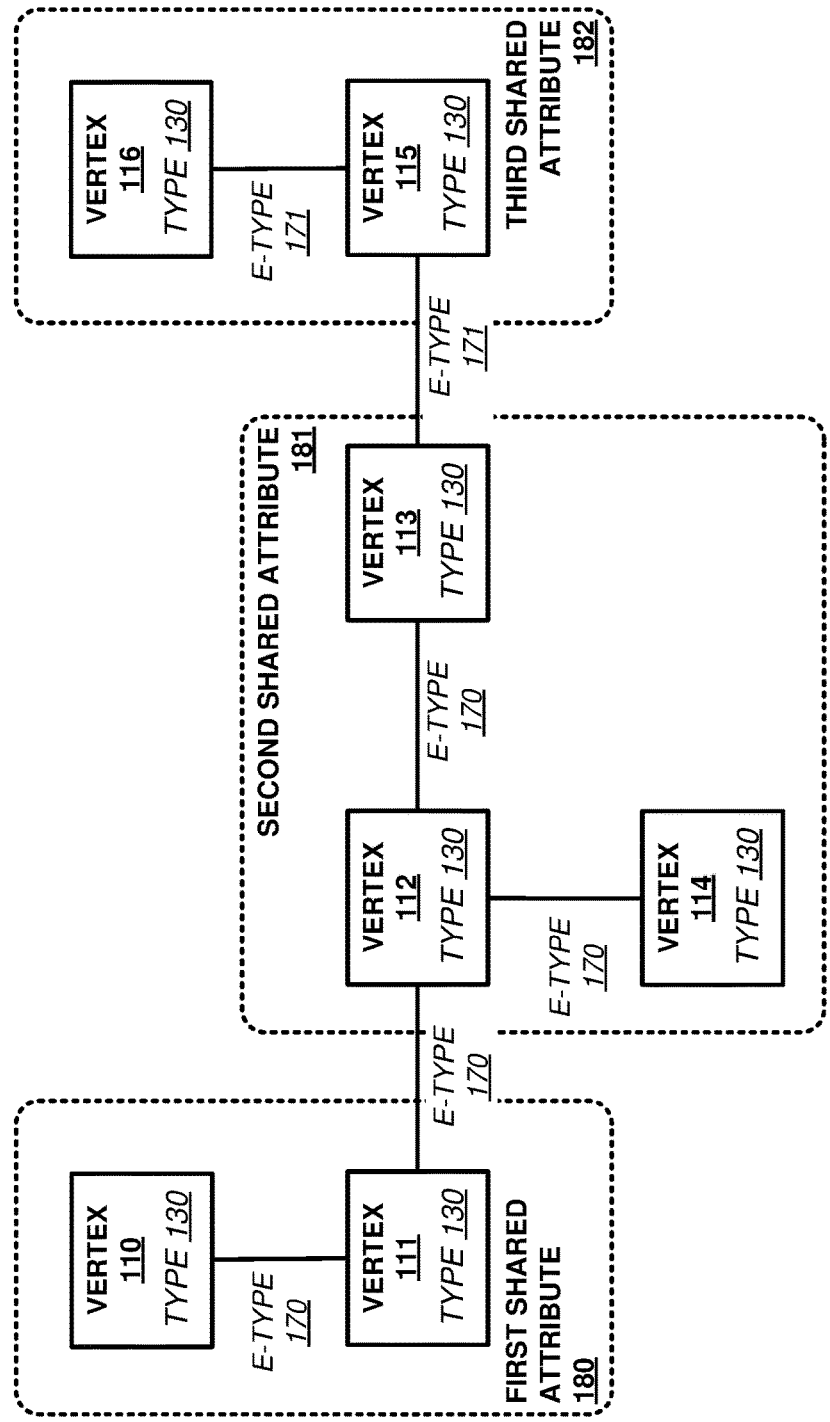
FIGS. 1A and 1B illustrate a graph update based on vertex attributes according to an implementation.
Figure 1B:
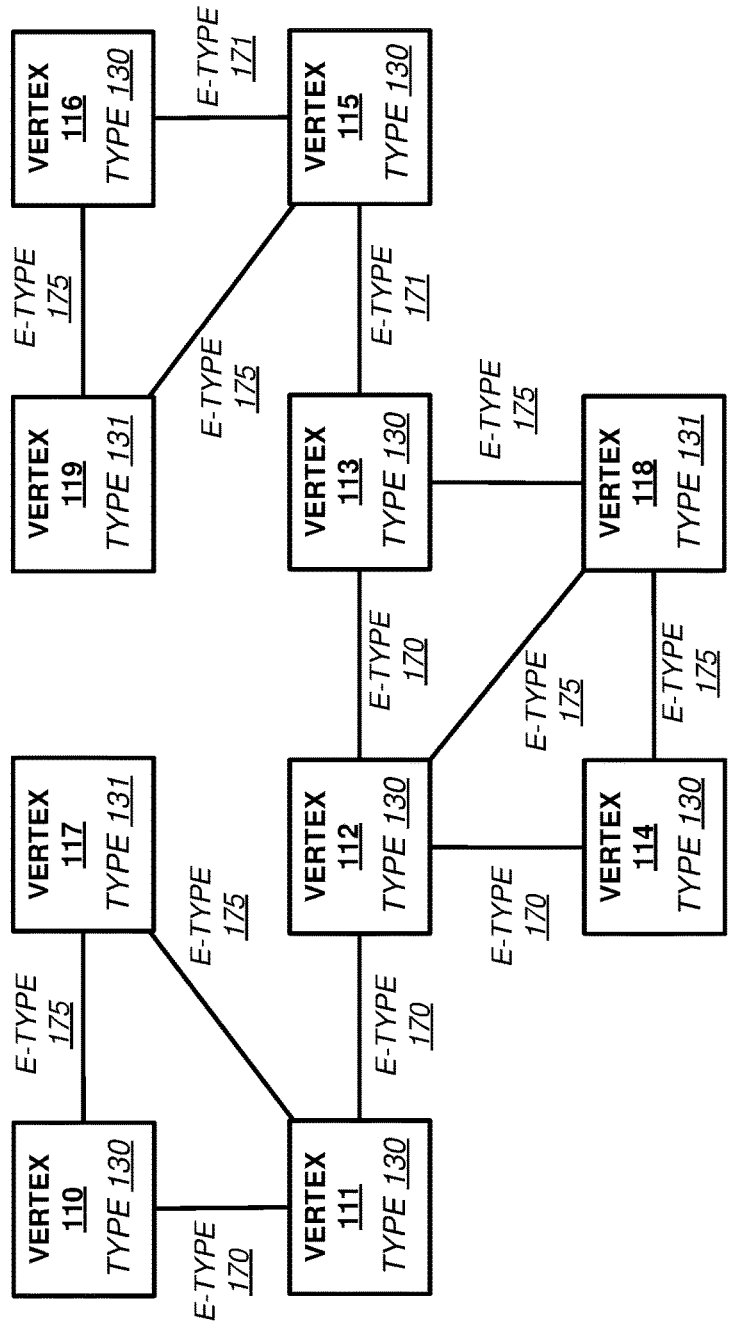

FIGS. 1A and 1B illustrate a graph update based on vertex attributes according to an implementation. FIG. 1A includes graph 100 with vertices 110-116 representative of data vertices of vertex type 130, which are coupled by various edges of edge types 170-171. Vertices 110-111 correspond to first shared attribute 180, vertices 112-114 correspond to second shared attribute 181, and vertices 115-116 correspond to third shared attribute 182. FIG. 1B introduces additional index vertices 117-119 of vertex type 131, which are coupled to other vertices by edge types 175.

Referring first to FIG. 1A, a graph management system may maintain graph 100 that includes various data vertices and edges, wherein each of the data vertices represents a data instance and edges represent the relationships between the data instances. In some implementations, each of the data instances may include multiple attributes that provide information about the data instance. As an example, if graph 100 were representative of a social network, each data vertex of vertices 110-116 may include attributes such as a user identifier, a user birthday, a user age, a location associated with the user, a profession, or some other similar attribute. In managing the various data vertices, the data vertices may be indexed using an attribute of the one or more attributes (a primary index value). For example, returning to the example of the social network, the data vertices may be indexed using unique identifiers associated with the users. This identifier may comprise a unique value of characters, a number, a name, or some other similar identifier to distinguish between the individual vertices.

In the present implementation, the graph management system may further be used to provide secondary indexing for the vertices. This secondary indexing may be used to add one or more index vertices that can be connected via edges to data vertices that share a corresponding attribute. For example, a request to build a secondary index for a social network graph may indicate a request to index users that are in the same location. As a result, the graph management system may search the attributes of the individual users and determine one or more locations that are associated with the individual users. Once the locations are identified, one or more new index vertices may be added to the graph that correspond to each of the locations, and edges may be generated that connect the new index vertices to the corresponding user data vertices in the graph. Here, vertices 110-111 each include first shared attribute 180, vertices 112-114 each include second shared attribute 181, and vertices 115-116 each include third shared attribute 182. The shared attribute may comprise a numerical value, a set of characters, a date, or some other similar attribute related to the data instances. For example, the attribute of shared attributes 180-182 may represent an age of a user in a social network, a location of the user in the social network, or some other similar attribute for a user.

Turning to FIG. 1B, as a graph is maintained, the graph management system may identify an event to generate secondary index vertices for graph 100. This event may comprise an administrator request to generate a new index or may comprise an event based on query trends to the graph. As an example, an administrator may generate a request to add index vertices related to a particular attribute of the current vertices. In response to the request, relevant index vertices may be generated based on the request, and edges may be generated to connect the data vertices with the new index vertices. Here, in response to the event to create new index vertices, vertices 117-119 are added that each correspond to a shared attribute of shared attributes 180-182. In particular, vertex 117 is added that corresponds to first shared attribute 180 and is coupled to vertices 110-111 via edges of edge-type 175 (an index edge type), vertex 118 is added that corresponds to second shared attribute 181 and is coupled to vertices 112-114 via edges of edge-type 175, and vertex 119 is added that corresponds to third shared attribute 182 and is coupled to vertices 115-116 via edges of edge-type 175. In some examples, the shared attribute may comprise a single value, however, the shared attribute may comprise a range of values or multiple values in some examples. In some examples, a user that requests the new index may determine the values or ranges that are relevant to the user. For example, the user may define age ranges for users, such that users are grouped based on the age ranges. In other implementations, the graph management system may determine values or ranges based on query trends to the graph. Thus, as an example, the ranges may be defined based on ranges that are frequently requested in queries to the graph.

Figure 2:
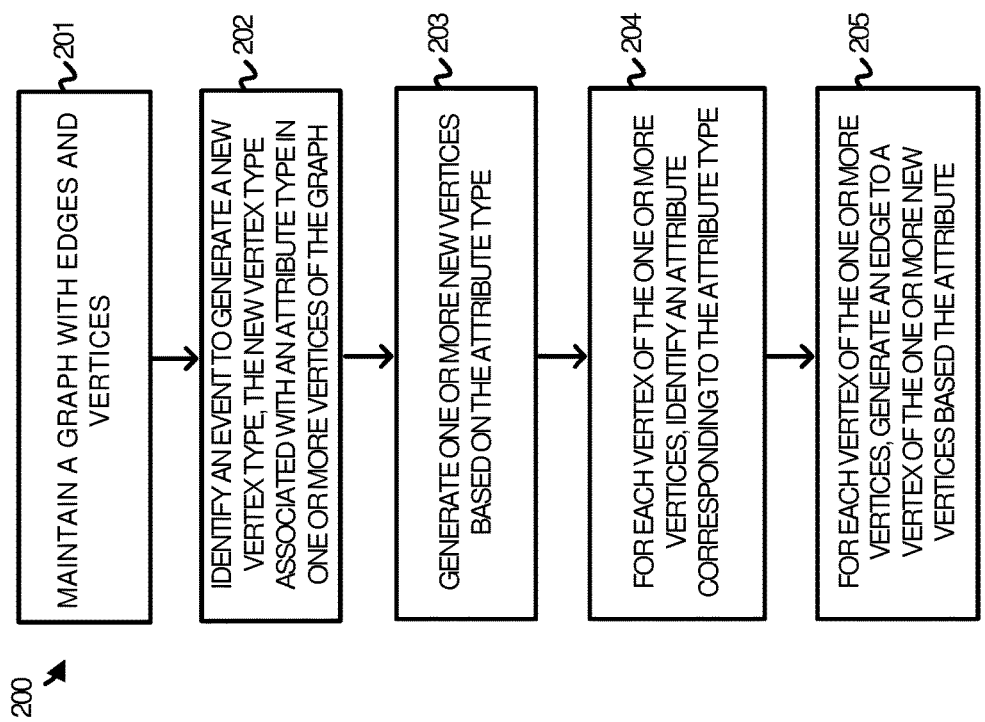
FIG. 2 illustrates an operation of a graph management system to update a graph based on vertex attributes according to an implementation.

FIG. 2 illustrates an operation 200 of a graph management system to update a graph based on vertex attributes according to an implementation. The processes of operation 200 are referenced parenthetically in the paragraphs that follow with reference to systems and elements of FIGS. 1A-1B.

As depicted in FIG. 2, a graph management system may maintain (201) graph 100, wherein graph 100 includes a plurality of vertices and edges. During the maintenance of the graph, the graph management system may identify (202) an event to generate a new vertex type, wherein the new vertex type is associated with an attribute type in one or more vertices of the graph. In some implementations, graph 100 may be indexed using primary indexing values, wherein the indexing values may comprise unique identifiers for each of the data vertices in the graph. However, using the primary indexing values, such as unique identifiers, to search the graph and respond to queries may not be the most efficient when the query is associated with other attributes of the vertex. For example, queries to a social network graph may frequently be generated regarding the location of users in the graph. Rather than searching the individual user vertices for the location of the user, the graph management system may generate a new vertex type corresponding to the location of the users, such that users that share a corresponding location may be connected to the same location indexing vertex.

In some implementations, in identifying the event for the new vertex type, a user or administrator of graph 100 may define an attribute type of interest. In response to identifying the attribute type, a new vertex type is generated that corresponds to the attribute type. In other implementations, rather than expressly defining the new vertex type, the graph management system may monitor trends in the queries to graph 100. These trends may be related to the type of attribute requested, the frequency that information related to the attribute was requested, or some other similar information related to the queries of graph 100. As the trends are monitored, the graph management system may determine when a trend meets event criteria, which triggers the addition of the vertex type to support the trend. Thus, if the graph management system observed the queries were frequently targeted at the age of users in a social network graph, then an event may be triggered to add additional index vertices to index the age of at least a portion of the users in graph 100.

Once the event is identified by the graph management system, operation 200 further generates (203) one or more new vertices based on the attribute type. In some implementations, in determining the new vertices to be added, a user or administrator of graph 100 may define the vertices that should be added. For example, in addition to identifying an attribute type of interest, the user may define values or a range of values for the attribute type that are of interest to the user. For example, if only particular user locations were relevant to the user, the user may define these locations, and index vertices may be generated that correspond to the locations. The user may also define that all locations are relevant in some examples. In other implementations, rather than relying on the user to define the various values and ranges for the new index vertices, the graph management system may use trends in the queries to the graph to determine the vertices that should be added to the graph. These trends may be based on the frequency of the queries, the values or ranges included in the queries, or some other similar information related to the trends of the queries. For example, the trends may be related to value ranges that are typically included in queries to the graph. Thus, using the social network example, if users of graph 100 frequently requested information about users in ten-year age ranges (e.g. 21-30, 31-40, etc.), then the generated vertices may correspond to the frequently used ranges in the queries. The frequent or trending values may be identified based on statistics from past queries, machine learning, trend identifying modules that process information about past queries, or some other similar operation capable of identifying values that satisfy criteria for generating a new vertex.

Once the new index vertices are generated, the graph management system identifies (204) an attribute corresponding to the attribute type for each vertex of the one or more vertices and generates (205) an edge from each of the one or more vertices to a new vertex of the one or more new vertices based on the identified attribute. Referring to an example from FIGS. 1A and 1B, once vertices 117-119 are added to graph 100, vertices 110-116 are inspected to identify relevant attributes associated with the attribute type for vertices 117-119. Accordingly, because vertices 110-111 share an attribute that is associated with vertex 117, vertices 110-111 are coupled via an edge vertex 117. Similarly, vertices 112-114 are coupled via an edge to vertex 118 based on the attribute represented by vertex 118, and vertices 115-116 are coupled via an edge to vertex 119 based on the attribute represented by vertex 119.

Advantageously, when a new query is generated to graph 100 that is related to the attribute type for vertices 117-119, vertices 117-119 may be used to respond to the query in a more efficient manner. As an example, if vertices of type 130 represented users and vertices of type 131 represented locations of the users, a query to graph 100 that requested a list of all users in a location associated with vertex 117 may require the graph management system to identify vertex 117 and identify any user coupled via an edge to vertex 117. In this manner, attributes of interest in the data vertices may be used to generate vertices of a new vertex type that can be traversed to respond various queries associated with the attributes of interest.

In some implementations, the secondary indexing vertices that are added to the graph may correspond to a range of values, wherein the range may comprise a numerical range, a data range, a range in colors, or some other range that indicates a set of multiple values. The range of values may be identified based on administrator definition, may be based on query trends, or may be based on any other manner. In some implementations, the range of values may be arranged in a hierarchy, such that tiers of ranges can be used in responding to various queries associated with the attribute type.

In some examples, the graph management system may identify the addition of vertices associated with vertex type 130. When a vertex is added to graph 100, the graph management system may identify an attribute in the added vertex associated with vertex type 131 and determine a vertex of type 131 that is associated with the attribute. Once the vertex of type 131 is identified, the graph management system may generate an edge of edge type 175 to couple the added vertex to the corresponding vertex of type 131. In some implementations, when a vertex is added to graph 100 that is of vertex type 130, the graph management system may determine that a vertex of vertex type 131 fails to support the attribute value of the added vertex. As a result, the graph management system may generate a new vertex of vertex type 131 that corresponds to the value and couple the added vertex of vertex type 130 to the new vertex of vertex type 131 using an edge of edge type 175.

Figure 3A:
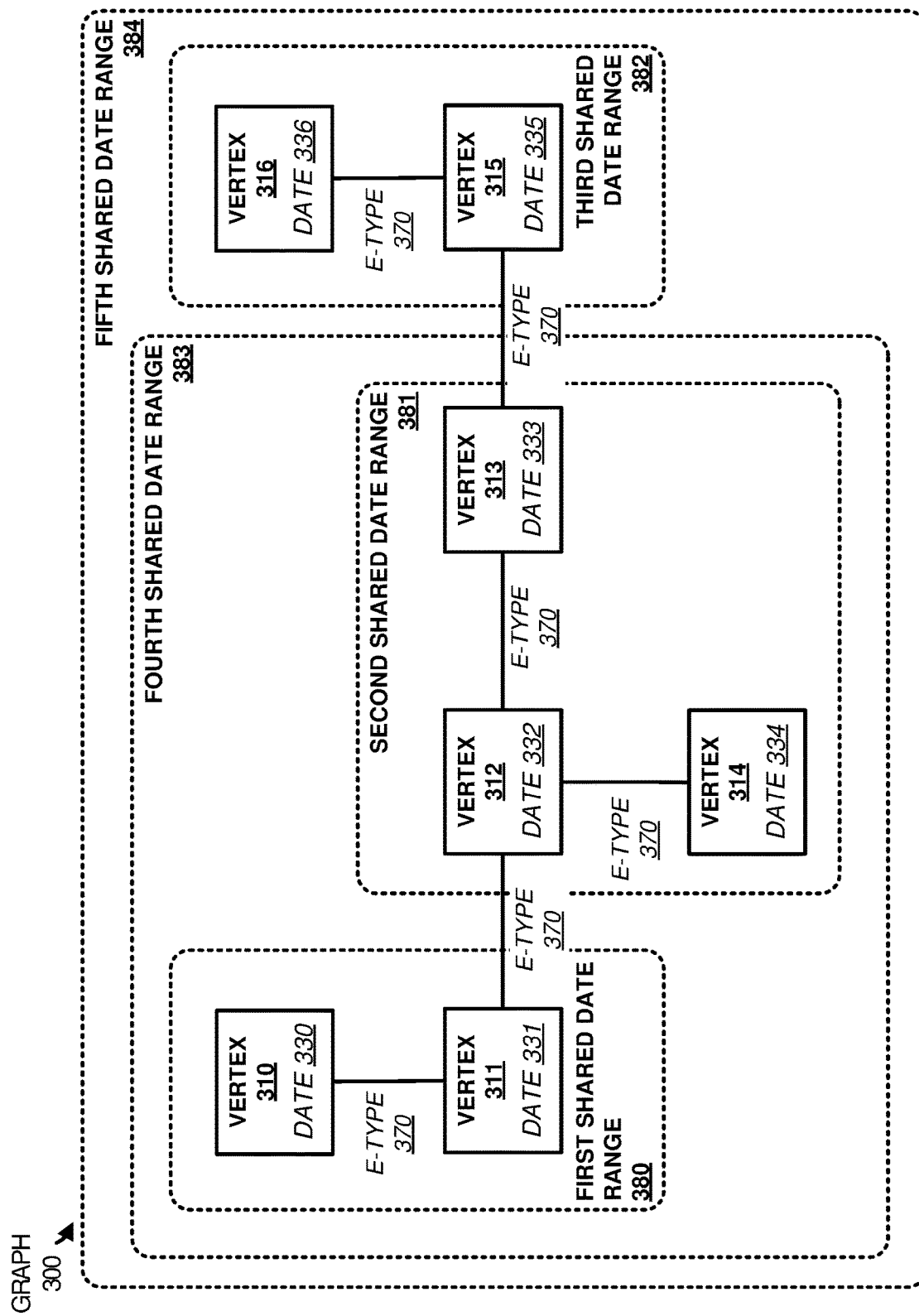
FIGS. 3A and 3B illustrate a graph update based on vertex attributes according to an implementation.
Figure 3B:
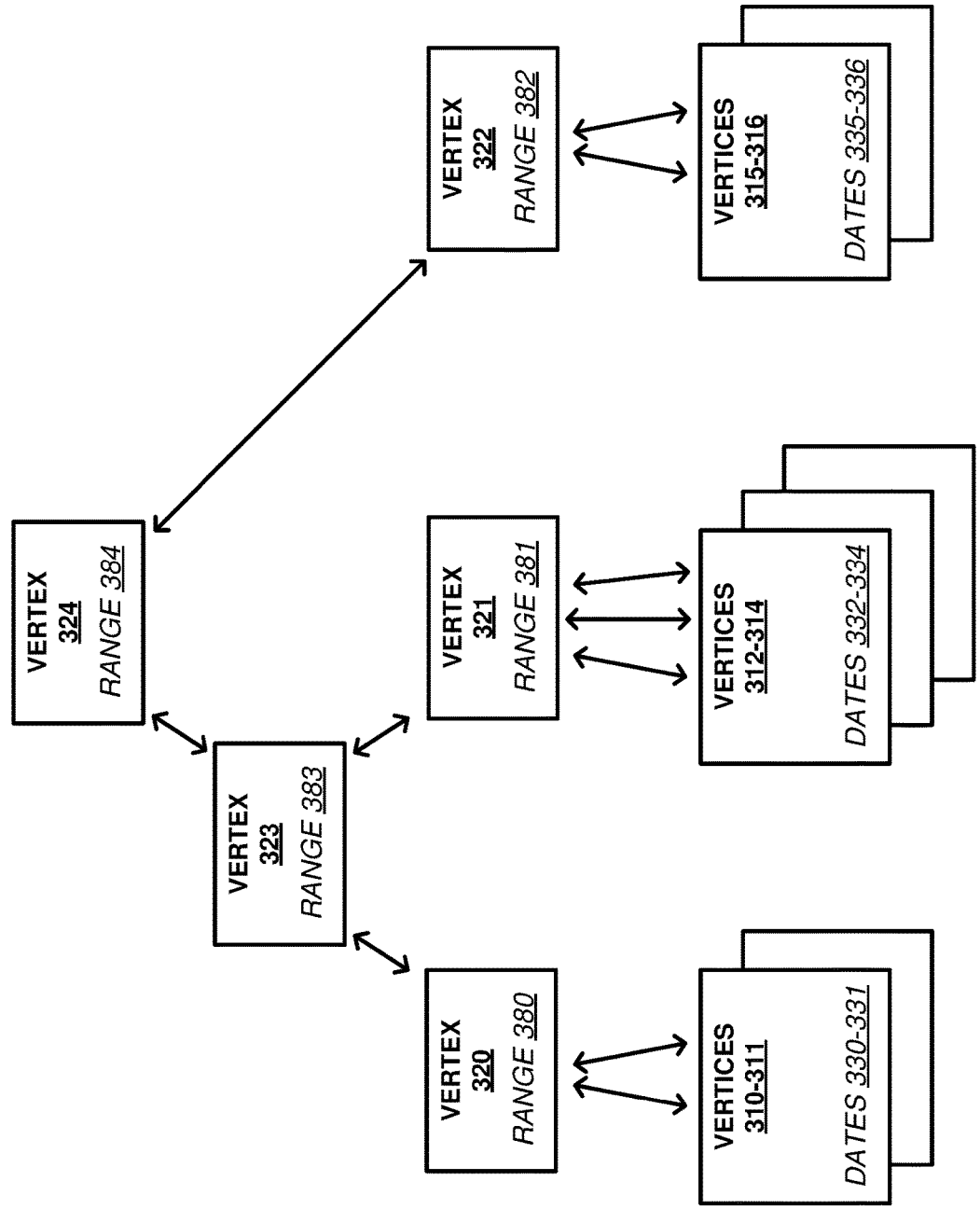

FIG. 3A-3B illustrate a graph update based on vertex attributes according to an implementation. FIG. 3A includes graph 300 with data vertices 310-316, which are coupled by edge type 370. Vertices 310-316 each include a corresponding date of dates 330-336, wherein the dates may represent a join date to a network or service, a birthday, or some other similar date relevant to a data instance, such as a user, employee, equipment, and the like. Vertices 310-311 correspond to first shared date range 380, vertices 312-314 correspond to second shared date range 381, vertices 315-316 correspond to third shared date range 382, vertices 310-314 correspond to fourth date range 383, and vertices 310-316 correspond to fifth shared data range 384. FIG. 3B introduces additional vertices 320-324, which are representative of new indexing vertices for graph 300.

As described herein, a graph management system may maintain a graph 300 comprising vertices and edges. In the graph, each of the vertices may include multiple attributes. For example, a user in a social network graph may include a unique identifier used to index the user in the graph, and may further include the user's name, birthday, occupation, location, or some other information about the user. Additionally, the graph may comprise edges that are used to connect or identify relationships between the various users in the graph. These relationships may include friendships, workplace relationships, or some other similar relationships between the users that belong to the social network. Although described using the example of the social network, it should be understood that the vertices and edges may represent other information, such as equipment, network and information technology operations, search operations (travel, documents, and the like), or some other operation.

In the present implementation, an attribute of the attributes allocated to each vertex of vertices 310-316 comprises a date of dates 330-336. These dates each correspond to one or more of date ranges 380-384. In determining date ranges 380-384 that are of interest in graph 300, an administrator may define the ranges of interest. For example, if dates 330-336 correspond to join dates of users for a social network, then the administrator may define date ranges of interest. In other implementations, the ranges of interest may be determined based on query trends to graph 300. These trends may include the total quantity of queries for a particular range, the frequency that the queries are obtained for various ranges, or some other similar trend. Based on the trends, date ranges of interest may be developed for graph 300.

Turning to FIG. 3B, FIG. 3B illustrates graph 300 after an event to generate a new vertex type, wherein the vertex type corresponds to an attribute type (attribute type for dates 330-336). In some implementations, the event to generate the new vertex type may comprise an administrator request to generate a new vertex type corresponding to an attribute in one or more vertices of the existing graph. For example, an administrator may request that a new vertex type is generated that corresponds to the attribute type for dates 330-336. In other implementations, the graph management system may monitor the queries to graph 300 and determine an attribute type of interest that corresponds to queries. This attribute type of interest may be determined based on trends in the queries, wherein the queries may attempt to identify all vertices (data instances) that qualify for a particular attribute, shortest path queries between vertices with a particular attribute, or some other similar query to graph 300. From the trends, the graph management system may determine when a trend meets criteria for generating a new vertex type.

Once an event is identified for graph 300, one or more new index vertices are added to the graph that correspond to the attribute type of interest. Here, rather than a single layer of new index vertices that correspond to the attribute type of interest, a hierarchy is generated that can be beneficial in identifying relevant vertices from vertices 310-316. In particular vertices 320-322 are generated that correspond to date ranges 380-382. Accordingly, edges are generated to connect vertices 320-322 and vertices 310-316 based on the range that each of vertices 310-316 corresponds. Additionally, vertex 323 is coupled via edges to vertices 320-321 because range 383 encompasses both ranges 380 and 381. Further, vertex 324 is coupled to vertices 323 and 322 because range 384 encompasses both ranges 383 and 382.

As described previously, each date range of data ranges 380-384 may be allocated by an administrator of graph 300 or may be identified based on the trends of the queries to graph 300. In the example of numerical values, the ranges may be used to develop a hierarchy, wherein first vertices representing a first set of ranges may be encompassed by a second set of vertices representing a second set of ranges. Thus, when a query is generated for the graph in association with the attribute of interest, the graph management system may identify one or more of the index vertices (vertices 320-324) that correspond to the query and use the identified index vertices to respond to the query. Advantageously, this may limit the quantity of traversals and searching required to respond to the query by using indexing vertices 320-324 over vertices 310-316. While not illustrated in FIG. 3B for simplicity, it should be understood that the edges of edge type 370 will remain in the graph following the generation of vertices 320-324. Additionally, while vertices 320-324 may be added to the graph to provide additional indexing for the data vertices in the graph, it should be understood that additional index vertices may be added to index the graph. For example, when an additional vertex of the same vertex type as vertices 310-316 is added to the graph, the graph management system may identify a vertex in vertices 320-322 that corresponds to a date in the additional vertex. When the vertex in vertices 320-322 is identified, the graph management system may generate an edge that connects the additional vertex to the corresponding vertex in vertices 320-322.

In some implementations, when an additional vertex is added to graph 300, ranges 380-384 may not apply to the value in the additional vertex. For example, if a date in the additional vertex fell outside of the range allocated to vertices 380-384, the graph management system may generate one or more range vertices capable of encapsulating the new date. Advantageously, as new data vertices are added to the graph, the graph management system may dynamically update the secondary indexing vertices to support new values identified in the new data vertices.

Figure 4:
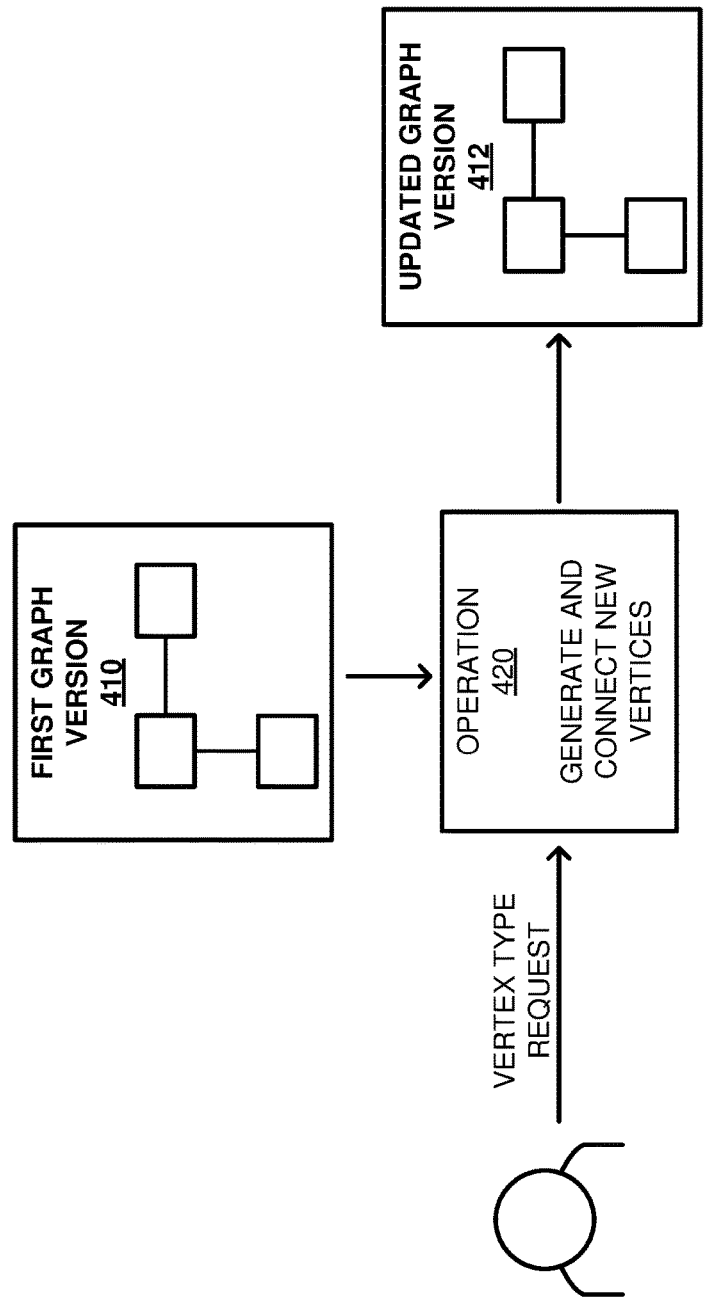
FIG. 4 illustrates an operational scenario of updating a graph according to an implementation.

FIG. 4 illustrates an operational scenario 400 of updating a graph according to an implementation. Operational scenario 400 includes administrator 405, first graph version 410, updated graph version 412, and operation 420.

As depicted in operational scenario 400, administrator 405 may generate a request to create a new vertex type for first graph version 410, wherein the new vertex type corresponds to an attribute in one or more data vertices of the first graph version 410. As an example, a social network graph may include data vertices that represent users of the social network, wherein each of the data vertices may include attributes of the user including the name of the user, the location of the user, the occupation of the user, or some other similar attribute type. From these attribute types, administrator 405 may select an attribute type of interest to generate a new vertex type in the graph. Thus, using the example above, the user may generate a request for a new vertex type that corresponds to user location.

In response to the request, which is identified by a graph management system, operation 420 is executed that generates new index vertices corresponding to the attribute type and connects the new index vertices to one or more data vertices to generate updated graph version 412. In particular, the graph management system may generate new index vertices corresponding to different attributes (different locations) of the attribute type, identify one or more data vertices in first graph version 410 with an attribute associated with the attribute type of interest, and generate edges that connect the one or more data vertices to corresponding index vertices. Returning to the example of user locations in a social network graph, the graph management system may generate new index vertices that correspond to different locations, may identify user data vertices with a location attribute, and connect the identified user vertices to corresponding index vertices that represent the different locations.

In some implementations, in generating updated graph version 412, operation 420 may generate new index vertices that correspond to a range of values, wherein the values may be numerical, dates, or some other similar value. For example, the new index vertices may represent a range of dates, a range of ages, or some other similar value. As a result, the data vertices in the graph may be connected to the new index vertices based on where a corresponding attribute falls in the various ranges. Further, in some implementations, the new index vertices may represent a hierarchy, wherein a first set of index vertices may be encompassed by another index vertex. Thus, using dates as an example, a first set of index vertices may be used to represent date ranges, and a second index vertex may represent a range that includes the date ranges of the first set. This second index vertex may connect to the first set of vertices using edges and may not connect directly to the data vertices with the corresponding attributes.

Figure 5:
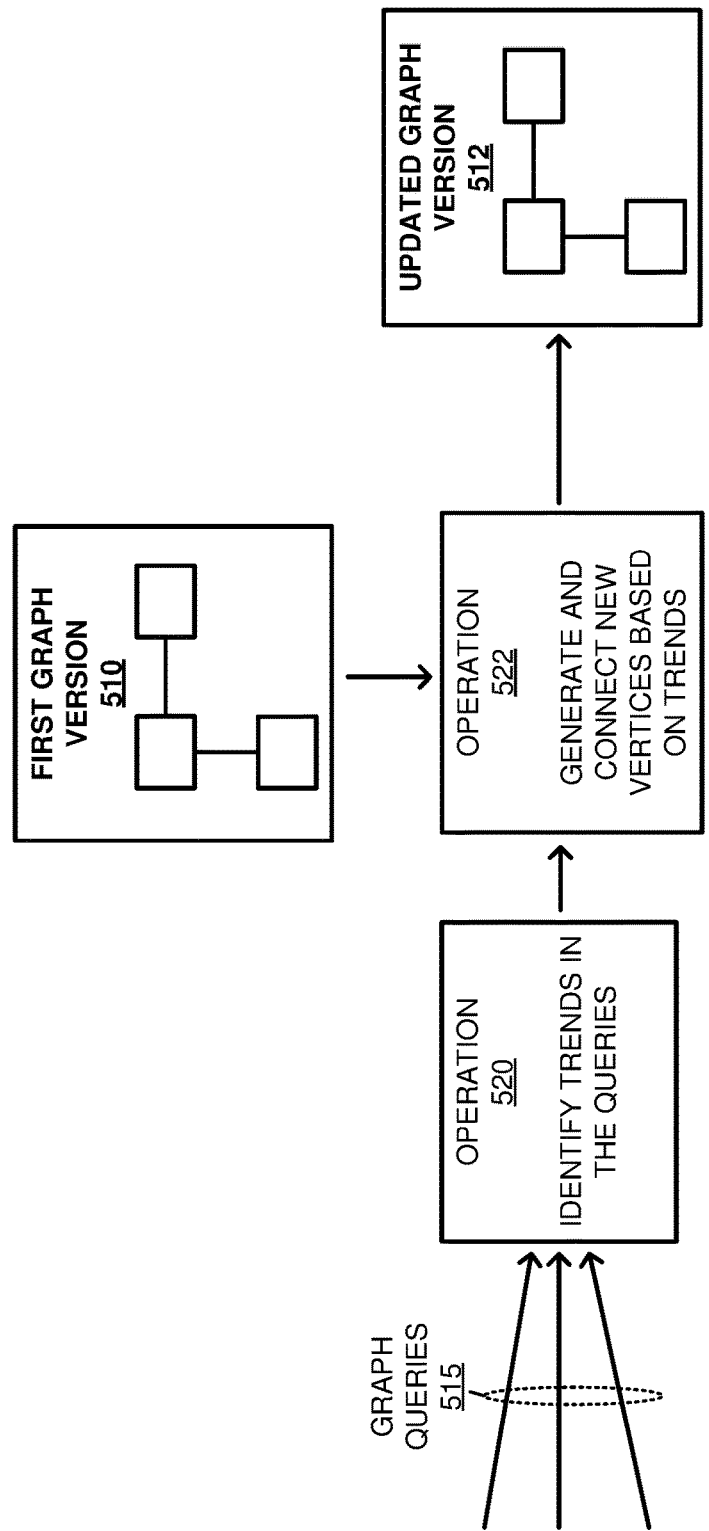
FIG. 5 illustrates an operational scenario of updating a graph according to an implementation.

FIG. 5 illustrates an operational scenario 500 of updating a graph according to an implementation. Operational scenario 500 includes first graph version 510, updated graph version 512, graph queries 515, operation 520, and operation 522.

As depicted, users of a graph may generate graph queries 515 to obtain information from a graph. These queries may include reachability queries, shortest path queries, queries to identify data instances in the graph, or some other similar query to a graph. As the queries are obtained by a graph management system that maintains the graph, the graph management system may implement operation 520 that identifies trends in the queries, wherein the trends may determine attributes of interest for the queries to the graph. As an example, a graph may maintain information about a workforce of a corporation, wherein the graph may include data vertices that correspond to workers, and the attributes of the vertices may include the workers' names, the workers' occupation, the workers' salary, the workers' home office, or some other similar attribute type for the workers. As queries are obtained for the graph, operation 520 may be used to determine the overall quantity of requests that are related to a particular attribute type, the frequency of which requests are related to a particular attribute type, or some other similar trend information related to an attribute type. From the monitored trends, operation 520 may further determine when one of the trends meets criteria to generate a new vertex type to provide secondary indexing for the graph, wherein the new vertex type corresponds to the relevant attribute type.

Once a trend for an attribute type meets the criteria, operation 522 generates new index vertices and connects the new vertices based on the trends. In generating the new index vertices, operation 522 may determine attributes of the attribute type that are available in first graph version 510. In an illustrative example, referring to the employee graph described previously, if a trend was identified related to the occupation of the employee, operation 522 may determine the various occupations that were available for the employees in the graph. Once the various occupations are identified, operation 522 may generate new index vertices that each correspond to the occupations. After generating the new index vertices, at least a portion of the existing data vertices may be coupled to the new index vertices based on the attributes. Thus, if a vertex represented the occupation of accountant, then any vertex representing an employee with the attribute of accountant may have an edge generated that connects to the index vertex representing the accountant occupation. In this manner, rather than searching each of the individual vertices for the corresponding attribute of interest during a query, the secondary indexing vertices may be used to quickly identify relevant information in the graph.

Although demonstrated in the previous example as using a single value for the secondary index vertices, it should be understood that ranges may be used for the index vertices, wherein the ranges may comprise data ranges, numerical values, or some other similar range. As a result, when the range index vertices are added to the graph, any data vertices with attributes that fall within the range may be coupled to a corresponding range vertex. Additionally, the use of ranges in vertices may permit index vertices to be arranged in a hierarchy. This hierarchy may permit first index vertices that correspond to first ranges to be encompassed by a second index vertex that encompasses the overall range of the first ranges. Thus, rather than identifying multiple indexing vertices that correspond to multiple ranges, a single vertex may be identified that encompasses the multiple ranges. In some implementations, in identifying the ranges for the index vertices, the graph management system may consider trends in the queries to first graph version 510. In particular, the graph management system may consider the parameters of the queries, such as frequently used ranges, non-frequently used ranges, or some other similar information to determine the ranges for the indexing vertices.

In some implementations, when index vertices are generated for the graph, index vertices may only be generated for vertices that are most relevant to recent queries. For example, if queries to first graph version 510 were frequently related to only a subset of the vertices, but not to other vertices in the graph, new index vertices may not be generated for the other vertices when they fail to meet trending criteria. Thus, instead of using resources in indexing irrelevant vertices, indexing may be provided for a portion or subset of first graph version 510 to generate second graph version 512.

In some examples, when a graph management system generates the secondary indexing vertices for a graph, the indexing may be accomplished during downtime of the system to preserve resources for queries. This downtime determination may include when processing resource use levels fail to reach defined criteria, may be based on a set time, or may be based on any other similar factor. As a result, although an event may be identified to generate a new indexing vertex type at a first time, the graph management system may delay the implementation of the indexing vertex type until a second time when resources are available to generate the new indexing vertices.

After generating the new indexing vertices, the graph management system may identify new queries to the graph and determine whether the queries are associated with the new indexing vertices. If a query is associated with the new indexing vertices, the graph management system may traverse one or more of the new indexing vertices to identify the relevant information of the query. Thus, if new indexing vertices corresponded to user locations of a social network, the graph management system may identify queries associated with user locations and use the user location vertices to identify the relevant information to respond to the query.

Figure 6:
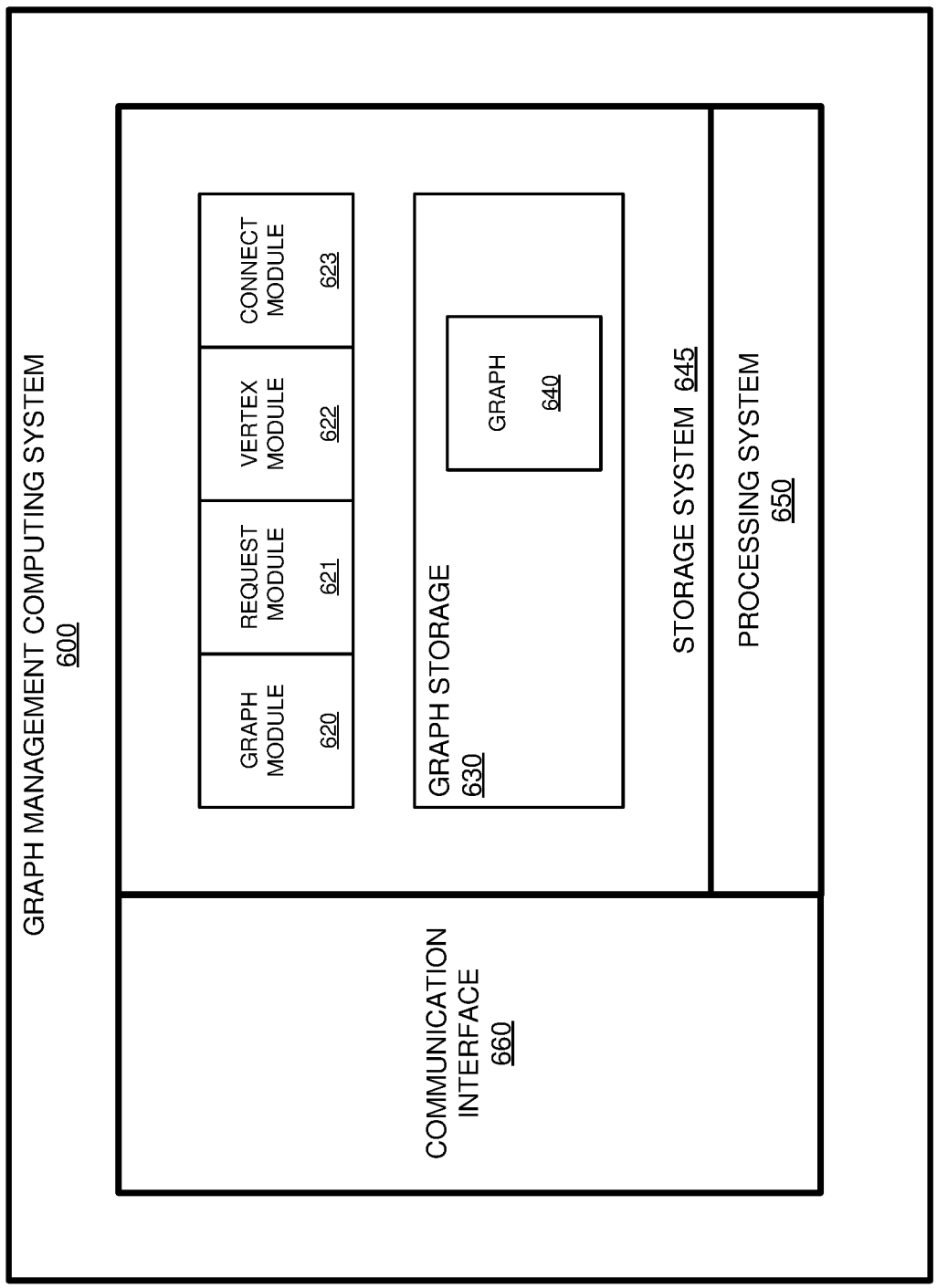
FIG. 6 illustrates a graph management computing system according to an implementation.

FIG. 6 illustrates a graph management computing system 600 according to an implementation. Graph management computing system 600 is representative of any computing system or systems with which the various operational architectures, processes, scenarios, and sequences disclosed herein for a graph management system can be implemented. Graph management computing system 600 includes storage system 645, processing system 650, and communication interface 660. Processing system 650 is operatively linked to communication interface 660 and storage system 645. Communication interface 660 may be communicatively linked to storage system 645 in some implementations. Graph management computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more end user computing systems in some implementations, wherein the communication interface may transfer and receive information related to graphs in graph storage 630.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises graph module 620, request module

621, vertex module 622, and connect module 623, wherein storage system 645 further includes graph storage 630 for graph 640. The operating software on storage system 645 may further include an operating system, utilities, drivers, network interfaces, applications, or some other type of software. When read and executed by processing system 650 the operating software on storage system 645 directs graph management computing system 600 to operate as described herein.

In one implementation, graph module 620 directs processing system 650 to maintain graph 640, wherein graph 640 includes data vertices that represent data instances and edges that represent relationships between the data instances. Graph 640 may be used to represent a social network, an organization, a search system, or some other similar type of graph. As an example, graph 640 may represent an organization's employees, wherein the data vertices represent the employees and the edges represent the relationships between the employees (e.g., supervisor, coworker, and the like). While maintaining graph 640, request module 621 may direct processing system 650 to identify a request or an event to generate a new vertex type that corresponds to an attribute type in one or more vertices of graph 640. Returning to the organization example, each of the employee vertices within graph 640 may include various attributes about each of the employees including names, birthdays, occupations, or some other similar attribute type. From the attribute types, an event may be identified that selects and attribute type of interest, wherein the attribute type of interest may be determined from a user selection or trends in the queries to graph 640.

In response to the event to generate a new vertex type, vertex module 622 directs processing system 650 to generate one or more new index vertices for graph 640 that can be used to index information for the desired attribute type. These index vertices may be specified by an administrator of graph 640, may be determined from trends in the queries to the graph 640, or may be determined in any other manner. As an illustrative example, if graph 640 represented an organization, a new vertex type may correspond to the occupation of the employees in the graph. The vertices generated for the new vertex type may include all of the available occupations or may include a subset of the available occupations.

Once the new index vertices are generated for graph 640, connect module 623 generates edges to connect the data vertices with the new indexing vertices. In particular, connection module 623 may parse each of the data vertices of the graph to identify an attribute associated with the attribute type and connect the data vertex to one of the new index vertices based on the attribute identified for the vertex.

In some implementations, vertex module 622 and connection module 623 may be used to generate a hierarchy of index vertices when the index vertices comprise a range of values. Thus, while a first set of index vertices may be directly connected to the preexisting vertices of the graph, a second vertex may encompass the entire range of values of the first set of index vertices. Further, while described above using the initial implementation of the index vertices, graph module 620 may be used to couple new data vertices that are added to the graph to the indexing vertices. Similarly, if required, new index vertices may be added to support newly added data vertices. For example, if a new employee were added to the graph with a new occupation, a new indexing vertex may be added that corresponded to the new occupation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying an event to generate a new vertex type in a graph, wherein the graph comprises a plurality of edges and a plurality of vertices, and wherein the new vertex type is associated with an attribute type in one or more vertices of the plurality of vertices, and wherein identifying the event comprises:
      monitoring one or more trends in queries to the graph; and
      determining when a trend of the one or more trends meets criteria to generate the event;
   in response to the event, generating one or more new vertices based on the attribute type;
   for each vertex of the one or more vertices, identifying an attribute corresponding to the attribute type; and
   for each vertex of the one or more vertices, generating an edge to a new vertex of the one or more new vertices based on the attribute identified for the vertex.

2. The method of claim 1 further comprising:
   identifying one or more value ranges associated with the attribute type; and
   wherein generating the one or more new vertices based on the attribute type comprises generating the one or more new vertices to each correspond to a value range of the one or more value ranges.

3. The method of claim 2, wherein the one or more value ranges comprise one or more dates.

4. The method of claim 2 further comprising:
   determining one or more additional value ranges associated with the attribute type, wherein each of the one or more additional value ranges encompass at least one of the one or more value ranges;
   generating one or more additional vertices to each correspond to a value range of the one or more additional value ranges; and
   for each vertex of the one or more new vertices, generating an edge to a corresponding vertex of the one or more additional vertices.

5. The method of claim 1 further comprising:
   identifying a request to generate a second new vertex type in the graph, wherein the second new vertex type is associated with a second attribute type in at least one vertex of the plurality of vertices;
   in response to the request, generating one or more additional vertices based on the second attribute type;
   for each vertex of the at least one vertex:
      identifying an attribute corresponding to the second attribute type; and
      generating an edge to an additional vertex of the one or more additional vertices based on the attribute identified for the vertex.

6. The method of claim 1, wherein the one or more new vertices are further generated based on the monitored one or more trends in the queries to the graph.

7. The method of claim 1 further comprising generating the graph.

8. An apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
identify an event to generate a new vertex type in a graph, wherein the graph comprises a plurality of edges and a plurality of vertices, and wherein the new vertex type is associated with an attribute type in one or more vertices of the plurality of vertices, and wherein identifying the event comprises:
monitoring one or more trends in queries to the graph; and
determining when a trend of the one or more trends meets criteria to generate the event;
in response to the event, generate one or more new vertices based on the attribute type;
for each vertex of the one or more vertices, identify an attribute corresponding to the attribute type; and
for each vertex of the one or more vertices, generate an edge to a new vertex of the one or more new vertices based on the attribute identified for the vertex.

9. The apparatus of claim 8, wherein the program instructions further direct the processing system to:
identify one or more value ranges associated with the attribute type; and
wherein generating the one or more new vertices based on the attribute type comprises generating the one or more new vertices to each correspond to a value range of the one or more value ranges.

10. The apparatus of claim 9, wherein the one or more value ranges comprise one or more dates.

11. The apparatus of claim 9, wherein the program instructions further direct the processing system to:
determine one or more additional value ranges associated with the attribute type, wherein each of the one or more additional value ranges encompass at least one of the one or more value ranges;
generate one or more additional vertices to each correspond to a value range of the one or more additional value ranges; and
for each vertex of the one or more new vertices, generate an edge to a corresponding vertex of the one or more additional vertices.

12. The apparatus of claim 8, wherein the program instructions further direct the processing system to:
identify a request to generate a second new vertex type in the graph, wherein the second new vertex type is associated with a second attribute type in at least one vertex of the plurality of vertices;
in response to the request, generate one or more additional vertices based on the second attribute type;
for each vertex of the at least one vertex:
identify an attribute corresponding to the second attribute type; and
generate an edge to an additional vertex of the one or more additional vertices based on the attribute identified for the vertex.

13. The apparatus of claim 8, wherein the one or more new vertices are further generated based on the monitored one or more trends in the queries to the graph.

14. The apparatus of claim 8, wherein the program instructions further direct the processing system to generate the graph.

15. A system comprising:
one or more non-transitory computer readable storage media; and
program instructions stored on the one or more non-transitory computer readable storage media that, when executed by a processing system, direct the processing system to:
generate a graph, the graph comprising a plurality of edges and a plurality of vertices;
identify an event to generate a new vertex type in the graph, wherein the new vertex type is associated with an attribute type in one or more vertices of the plurality of vertices, and wherein identifying the event comprises:
monitoring trends in queries to the graph, wherein the trends relate to attribute types requested in the queries; and
determining when a trend of the trends meets event criteria to generate the event;
in response to the event, generate one or more new vertices based on the attribute type;
for each vertex of the one or more vertices, identify an attribute corresponding to the attribute type; and
for each vertex of the one or more vertices, generate an edge to a new vertex of the one or more new vertices based on the attribute identified for the vertex.

16. The system of claim 15, wherein the program instructions further direct the processing system to:
identify one or more value ranges associated with the attribute type; and
wherein generating the one or more new vertices based on the attribute type comprises generating the one or more new vertices to each correspond to a value range of the one or more value ranges.

17. The system of claim 15, wherein the one or more new vertices is further generated based on the monitored one or more trends in the queries to the graph.

* * * * *